United States Patent [19]

Jaffre et al.

[11] Patent Number: 5,685,524
[45] Date of Patent: Nov. 11, 1997

[54] DIRECT IRONMAKING OR STEELMAKING APPARATUS USING SELF-REDUCING IRON OXIDE PELLETS

[75] Inventors: Richard T. Jaffre; Harry D. Hunt, both of Cedar Hill, Tex.

[73] Assignee: Chaparral Steel Company, Midlothian, Tex.

[21] Appl. No.: 587,300

[22] Filed: Jan. 16, 1996

[51] Int. Cl.$^6$ .................................................. C21B 11/06
[52] U.S. Cl. ........................................ 266/173; 266/175
[58] Field of Search .................................. 266/171, 173, 266/175, 168

[56] References Cited

U.S. PATENT DOCUMENTS

| | | | |
|---|---|---|---|
| 2,806,779 | 9/1957 | Case | 75/3 |
| 3,150,958 | 9/1964 | Collin et al. | 75/4 |
| 3,174,846 | 3/1965 | Brisse et al. | 75/3 |
| 3,264,092 | 8/1966 | Ban | 75/5 |
| 3,316,081 | 4/1967 | Bratton | 75/3 |
| 3,382,063 | 5/1968 | Imperato, Jr. | 75/3 |
| 3,390,979 | 7/1968 | Greene | 75/11 |
| 3,567,428 | 3/1971 | Svensson | 75/3 |
| 3,617,254 | 11/1971 | Imperato, Jr. | 75/3 |
| 3,653,874 | 4/1972 | Schulte | 75/3 |
| 3,653,876 | 4/1972 | Wienert | 75/28 |
| 3,770,416 | 11/1973 | Goksel | 75/25 |
| 3,864,120 | 2/1975 | Knuppel et al. | 75/5 |
| 3,925,060 | 12/1975 | Bloom et al. | 75/11 |
| 3,938,987 | 2/1976 | Ban | 75/3 |
| 3,966,456 | 6/1976 | Ellenbaum et al. | 75/41 |
| 4,025,297 | 5/1977 | Smith et al. | 432/112 |
| 4,179,283 | 12/1979 | Rehder | 75/40 |
| 4,201,370 | 5/1980 | Evans et al. | 266/44 |
| 4,244,732 | 1/1981 | Brauns | 75/38 |
| 4,356,027 | 10/1982 | Sugiyama et al. | 75/0.5 R |
| 4,528,029 | 7/1985 | Goksel | 75/3 |
| 4,529,446 | 7/1985 | Valenti | 75/256 |
| 4,613,363 | 9/1986 | Wienert | 75/10.62 |
| 4,728,358 | 3/1988 | Hoffman et al. | 75/0.5 R |
| 4,824,479 | 4/1989 | Matsuoka et al. | 75/0.5 R |
| 4,846,884 | 7/1989 | Shigematsu et al. | 75/3 |
| 4,963,185 | 10/1990 | Ellenbaum et al. | 75/323 |
| 4,983,214 | 1/1991 | Bottinelli et al. | 75/387 |
| 5,149,363 | 9/1992 | Contrucci et al. | 75/414 |
| 5,238,486 | 8/1993 | Kremenets | 75/492 |
| 5,286,278 | 2/1994 | Heckel | 75/746 |
| 5,421,859 | 6/1995 | Wienert | 75/766 |

FOREIGN PATENT DOCUMENTS

| | | |
|---|---|---|
| 48-000120 | 1/1973 | Japan. |
| 54-040201 | 3/1979 | Japan. |
| 60-131930 | 7/1985 | Japan. |
| 01401064 | 7/1986 | U.S.S.R. |
| 1742343 | 6/1992 | U.S.S.R. |
| 01195468 | 6/1970 | United Kingdom. |

*Primary Examiner*—Scott Kastler
*Attorney, Agent, or Firm*—Jones, Day, Reavis & Pogue

[57] ABSTRACT

Apparatus for preheating self-reducing pellets for direct use in ironmaking or steelmaking in which a preheat chamber contains the pellets and is primarily externally heated using waste exhaust gases and secondarily heated directly by using an internal preheat burner. The preheat chamber gases are vented into the external heating chamber where any CO present is post-combusted to produce $CO_2$ with the energy from the post-combustion used to contribute to external heating of the preheat chamber.

34 Claims, 3 Drawing Sheets

DIRECT IRONMAKING OR STEELMAKING APPARATUS USING SELF-REDUCING IRON OXIDE PELLETS

BACKGROUND OF THE INVENTION

1. Field of the Invention

The present invention relates in general to the use of self-reducing pellets or agglomerates in ironmaking and steelmaking and in particular to apparatus for preheating suitable serf-reducing pellets/agglomerates in a preheat chamber that is heated externally using waste heat from steelmaking and other industrial operations while controlling atmospheric conditions inside the preheat chamber such that, when properly preheated, a charge of the preheated pellets/agglomerates is transferred directly into melting or smelting furnaces to optimize recovery of liquid steel from oxides.

2. Description of Related Art

Iron oxide pellets and agglomerates are employed as charge materials for a variety of processes that use solid and gaseous reductants that are external to the pellets and agglomerates to effect the reduction of iron oxide to metallic iron. Such processes include the blast furnace (using coke as the external reductant), various direct steelmaking processes (using primarily coal as the external reductant), and a variety of "direct reduction" processes (which use gaseous $H_2$ and/or $CO_2$ as the external reductants). In the aforementioned cases, the iron oxide pellets and agglomerates are not "self-reducing".

By "self-reducing" is meant: the practice wherein freely divided oxide-containing materials, such as iron ore concentrates and steel plant dusts, are mixed with suitable finely divided fluxes and/or binders, and finely divided carbonaceous material, the latter present in amounts sufficient to reduce all the oxide to metallic form, the mixture of such materials being formed into pellets or agglomerates using various well-known techniques.

When the "self-reducing" pellets/agglomerates are heated to sufficient temperature, the reductants in the pellet combine with the oxygen in the oxide to evolve gaseous CO, $CO_2$, and possibly $H_2O$. The reduction of iron oxide by carbon is endothermic. That is, energy must be provided to drive the reduction reaction. The concept of producing self-reducing pellets or agglomerates for use in ironmaking and steelmaking is not new.

U.S. Pat. No. 2,806,779 to Case describes practices for making self-reducing pellets and their use in ironmaking (but not steelmaking).

U.S. Pat. No. 3,174,846 to Brisse et. al. discloses a method of briquetting iron oxide frees with coal and discloses practices for their use as blast furnace charge material (i.e. ironmaking, not steelmaking).

U.S. Pat. No. 3,264,092 to Ban discloses a system for producing carbonized and metallized iron ore pellets and characterizes such "discrete metallized pellets" as suitable "for use in a smelting operation such as a cupola type furnace or a blast furnace" (i.e. ironmaking, not steelmaking).

Another, U.S. Pat. No. 3,938,987, to Ban discloses an improved process for producing carbonaceous and metallized iron ore pellets for use in a steelmaking furnace which includes use of a "traveling grate machine" to sinter the pellets and make up any deficiency in carbonaceous material contained in the pellets via carbonaceous material externally supplied to the sinter bed.

An improvement on the "traveling grate machine" concept is disclosed in Weinert U.S. Pat. No. 5,421,859. Weinert's process is designed to allow the use of bituminous, subbituminous or lignite coals as sources of the carbon for reduction in the self-reducing "composite pieces" (i.e. agglomerates), and calls for a complicated system of chambers (enclosing the traveling grate) for drying, pyrolizing the volatiles in the coal, carbonizing, and, either cooling the agglomerates under reducing atmospheric conditions for subsequent handling and storage, or heating the agglomerates to a temperature suitable for a direct charging into a steelmaking furnace, i.e. "a temperature sufficiently high that the endothermic quasi-solid state reaction of the carbon-reducible oxide material in the composites (i.e. agglomerates) takes place before fusion of the composites occurs."

U.S. Pat. No. 3,382,063 to Imperato discloses "an ore agglomerate and method for making such agglomerates which is much less expensive than sintered agglomerates and is at least partially serf-reducing", but does not teach apparatus or practices for the use of such agglomerates in either ironmaking or steelmaking furnaces. Another Imperato U.S. Pat. No. 3,617,254, discloses an improved method of making ore agglomerates which are said to be suitable for handling and use in steelmaking furnaces, but the patent does not describe any specific apparatus illustrating how such agglomerates could be used in steelmaking furnaces.

U.S. Pat. No. 4,528,029 to Goskel also describes practices for producing self-reducing iron oxide agglomerates for ironmaking and steelmaking but does not describe any specific apparatus for their use in ironmaking or steelmaking furnaces.

U.S. Pat. No. 4,529,446 to Valenti also describes practices for producing self-reducing iron oxide agglomerates for ironmaking and steelmaking, but, again, does not describe any specific apparatus for such use.

U.S. Pat. No. 5,149,363 to Contrucci et al. discloses a process for smelting or melting ferrous or non-ferrous metal from self-reducing agglomerates or metal. However, when the charge materials consist of either metallic iron or self-reducing iron-containing oxide agglomerates, the apparatus and practices relate to the production of molten iron, not steel. No disclosure is made that Contrucci's invented furnace and practices are suitable for refining molten iron into steel.

U.S. Pat. No. 3,150,958 to Collin et al. discloses a process for the reduction of metals from oxide and teaches general principles for use of self-reducing pellets in steelmaking. However, it is stated in the Collin patent that, "the apparatus for carrying out our preheating step is not critical." Thus no specific apparatus is described.

U.S. Pat. No. 3,925,060 to Bloom et al. describes a "compact containing iron oxide and carbon and method for its use in steelmaking." The steelmaking method described by Bloom et al. consists of cold charging the self-reducing compacts (i.e. agglomerates) into the steelmaking furnace along with the other charge materials. This method relies principally on radiation from the molten bath to heat the charge materials and drive the reduction reaction, with the result that electrical energy consumption is very high. Further, Bloom et al. teach the use of an asphalt binder (3 to 6 percent by weight) in the manufacture of self-reducing agglomerates. Since the agglomerates are charged cold, during the progressive heating of the self-reducing agglomerates, certain organic compounds in the asphalt binder will volatilize and most of the organic compounds that volatilize would not be combusted completely prior to their evacuation by the furnace exhaust system, thereby creating a pollution problem. Further, there is free oxygen in the steelmaking furnace atmosphere during the progressive heating of the self-reducing agglomerates. The free oxygen burns off some of the carbonaceous material contained in the agglomerates, carbonaceous material that is needed for reduction of the iron oxide. The burning off of carbonaceous material contained in the agglomerates results in iron oxide fusing with the slag, with no economical means of reducing the iron oxide, thereby contributing to corrosion of the furnace lining and increased slag volume which is, of course, wasted.

SUMMARY OF THE INVENTION

The present invention discloses apparatus for making use of hot waste gases from steelmaking and other industrial processes to provide energy for self-reducing pellet/ agglomerate preheating and to drive the endothermic reduction reaction. The present invention can utilize the waste heat gases from steelmaking furnaces such as the electric arc furnace (EAF), or the basic oxygen furnace (BOF). It is believed that waste gases for such sources have not been used in the prior art due to the "batch" nature of these processes with short cycle times per "batch", generally under 1½ hours. This means production of exhaust gases is intermittent with varying temperature, gas composition, and particulate content over the course of the "batch" production cycle.

In the present invention, the self-reducing pellets/ agglomerates are charged into an externally heated preheat chamber whose interior atmosphere is maintained free of oxygen. A variety of preheat chamber configurations are used. The preheat chamber is heated externally by waste heat from industrial operations and internally by a burner inside the preheat chamber which heats the pellets/ agglomerates directly. The burner is fired in a fashion that provides an atmosphere inside the preheat chamber that is free of oxygen. In addition, provision is made to introduce inert and/or reducing gases (e.g., $H_2$, CO) into the preheat chamber as necessary to control temperature inside the preheat chamber, to prevent overheating and premature fusion of the self-reducing pellet charge, and to maintain oxygen-free or reducing conditions inside the preheat chamber. Positive pressure is maintained in the preheat chamber at all times relative to ambient pressure so as to prevent introduction of oxygen into the preheat chamber.

Principal sources of large amounts of waste heat produced by steelmakers and utilized as an external heat source in the present invention include exhaust gases from melting or smelting furnaces such as, for example, the EAF, the BOF, and the energy optimizing furnace (EOF). Further, as used hereafter, exhaust gases from melting or smelting furnaces will be referred to as "melting exhaust gases".

Exhaust gases include those from liquid or gas-fired furnaces that are used to heat or reheat semi-finished steel (including ingots, billets, and blooms) for hot working, including hot rolling, and liquid or gas-fired furnaces used to heat or reheat hot or cold worked steel for the purpose of thermal treatment, including annealing. For the purpose of further discussion, exhaust gases from such heat or reheat furnaces will be referred to as "reheat exhaust gases".

In the present invention, the preheat chamber exhaust gases, including any CO evolved from the self-reducing pellets during preheating, are vented to outside the preheat chamber and post-combusted. This process also converts the CO into $CO_2$. The preheat chamber is so configured that the heat resulting from post-combustion is used to contribute to externally heating the preheat chamber.

The purpose of preheating the pellets is to prevent the pellets from breaking apart (as likely would occur if introduced cold directly into molten material at steelmaking temperatures), and achieve a level of metallization (i.e. reduction of the iron oxide) at the preheat stage. After preheating the pellets to temperatures and for a time period sufficient to substantially reduce the contained iron to metallic form (at least 1000° C.), but to temperatures not so high as to cause fusion of the pellets to occur inside the preheat chamber, the pellets are charged semi-continuously into an ironmaking or steelmaking furnace during appropriate time "windows" in the ironmaking or steelmaking cycle. A "time window" begins at the point where the molten material (slag and metal) is present in a sufficient amount to absorb the pellets so that the time of exposure of the pellets to the furnace atmosphere during the introduction into the ironmaking or steelmaking furnace is minimized.

In order to accommodate larger slag volumes, modification of the ironmaking or steelmaking furnace shell and hearth geometry and refractory lining materials and practices may be necessary if the pellets/agglomerates exceed 10 to 20 percent of the furnace charge weight. Such modification is well within the skill of those in the art.

Once introduced into the melting or smelting furnace, the preheated pellets/agglomerates complete self-reduction and are melted in the slag and/or the iron or steel bath. The metallic iron becomes part of the iron or steel bath. As is well known in the art, oxygen may be injected into the molten bath to remove any excess dissolved carbon. Carbon could be injected into the molten slag when high slag iron oxide contents are experienced in order to reduce the iron oxide content of the slag. Again, such operations are well known in the art.

The novel "direct ironmaking or steelmaking" concept of the present invention envisions self-reducing pellets initially as a complement to scrap and/or hot metal in the melting or smelting furnace charge. Most ironmaking or steelmaking applications do not require 100 percent "virgin materials" in the charge (i.e. "virgin" means charge materials produced from iron ore). An estimated 75 percent of the world's iron or steel products could be made from a charge consisting of 50 percent scrap (which may contain undesirable tramp elements such as Cu, S, Cr, Sn, and the like), plus 50 percent "virgin materials", (used to dilute tramp elements in the scrap). Thus, use of an estimated 10 to 20 percent of self-reducing pellets in a conventional, melting or smelting furnace is not likely to require physical change to the furnace itself beyond modifications to accommodate the pellet preheat and feed system. As stated earlier, above an estimated 20 percent of the charge rate, the furnace shell and hearth geometry (and refractory lining materials and practices) may require modification in order to accommodate larger slag volumes. Again, such modifications are well within the skill of those in the art of ironmaking and steelmaking.

In the present invention, a preheat chambered pellet tumbler is formed as an elongated cylinder that is rotated to tumble the pellets therein. The pellets are provided from a storage bin through a pellet feed valve to a feed chamber where a charging device such as a piston, or an auger, forces the pellets into the interior of the rotating preheat cylinder. As used herein, the term "pellets" refers to self-reducing pellets or agglomerates. Further, the term "waste heat" will refer to either melting exhaust gases, reheat exhaust gases, or wasted hot gases from other industrial processes. Thus preheating of the pellets occurs inside a heat resistant and high temperature corrosion resistant cylindrical pipe called the preheat chamber pellet tumbler which rotates continuously at speed, R. Rotation of the preheat chamber is essential to assure temperature uniformity, to prevent distortion of the preheat chamber due to temperature differences, and to promote temperature uniformity in the pellet charge inside the preheat chamber. The thickness, T, of the heat-resistant and high temperature corrosion-resistant cylinder must be sufficient so that the preheat chamber acts as a "thermal flywheel" given the possible cyclical temperature profile of waste heat sources and to assure that the preheat chamber possesses sufficient strength to support its own weight and the weight of Rotation of the contained pellet charge.

Rotation of the preheat chamber is driven by pellet tumbler drive wheels that also support the weight of the preheat chamber. The preheat chamber is substantially enclosed in an external heating chamber and is heated externally by waste heat. Waste heat flows around the rotating preheat chamber and exits through a duct to appropriate pollution control equipment such as a baghouse or scrubber. The pellet tumbler drive wheels are outside the external heating chamber.

The atmosphere inside the preheat chamber must be isolated from the atmosphere of its surroundings. It is critical to maintain positive pressure inside the preheat chamber in order to prevent any "backwash" of oxygen into the pellet chamber from gases in the external heating chamber or other sources. In order to assure unimpeded flow of pellets in the pellet travel direction, the cylindrical preheat chamber should extend at one end over the end of a cylindrical stationary pellet feed chamber and inside the end of a cylindrical portion of the opposite flame chamber.

Self-reducing pellets are fed from the storage bin through a pellet feed valve into the stationary pellet feed chamber. The pellet feed valve is necessary to prevent escape of the internal pellet chamber gases into the pellet storage bin.

Once the pellet feed chamber is charged, a device such as a charge piston or auger carries the pellets into the preheat chamber in the pellet travel direction. The cycle of charging the stationary pellet feed chamber and of carrying the pellets into the preheat chamber is repeated until the preheat chamber is filled with the desired amount of pellets.

At the appropriate point in the melting or smelting furnace cycle, when molten material (slag and metal) is present in a sufficient amount to absorb the preheated pellets, the preheated pellets are introduced directly into the molten material in the ironmaking or steelmaking furnace through a pellet output valve. The pellet output valve is necessary to isolate the pellet preheat chamber and a surge chamber from the atmosphere of the melting or smelting furnace. It is important to minimize the time of exposure of the preheated pellets to the furnace atmosphere during their introduction into the ironmaking or steelmaking furnace.

Thus it is an object of the present invention to provide apparatus for ironmaking or steelmaking in which self-reducing pellets are preheated to the proper temperature and then transferred substantially directly into the molten metal in the iron or steel furnace.

It is another object of the present invention to provide a preheat chamber for the self-reducing pellets and wherein the preheat chamber is rotated to provide even heating of the pellets, to prevent distortion of the pellet preheat chamber due to temperature differences, and to provide a "thermal flywheel" to assure temperature uniformity.

It is also an object of the present invention to provide external waste heat to the outside of the pellet preheat chamber as the primary energy source to indirectly heat the self-reducing pellets and to provide additional direct internal heat to the interior of the pellet preheat chamber on an "as needed" secondary basis.

It is still another object of the present invention to provide a pellet feed valve to control the charge of pellets to the pellet preheat chamber and to prevent escape of internal pellet preheat chamber gases into the pellet storage bin.

It is a further object of the present invention to provide a pellet output valve between a surge chamber and the iron or steel furnace to isolate the pellet preheat chamber and the surge chamber from the atmosphere of the iron or steel furnace.

It is yet another object of the present invention to provide pistons at each end of the rotating pellet chamber, one of which pistons causes the charge to be inserted into the pellet chamber, both of which pistons maintain the pellets within the preheat chamber during preheating thereof, and the other of which allows the preheated pellets to be discharged from the pellet preheat chamber to a surge chamber and pellet output valve to the iron or steel furnace.

It is still a further object of the present invention to provide a helical blade on the inside of the cylindrical pellet chamber to carry the pellets from one end to the other during preheating.

It is a further object of the present invention to provide a rotating auger on the interior of the pellet preheat chamber that rotates at a speed, r, greater than the rotational speed, R, of the pellet preheat chamber so as to move the pellet from a feed chamber to the interior of the pellet preheat chamber. The direction of rotation of the auger is then reversed to a speed r=−R such that the pellets are held stationary within the pellet preheat chamber during preheating and thereafter for the rotating auger to again assume a speed r>R in the same direction to eject the preheated pellets from the preheat chamber to the surge chamber and pellet output valve.

It is still another object of the present invention to couple waste gases generated during preheating of the pellets from the interior of the pellet preheat chamber to an external heating chamber which, along with waste heat gases from a source such as the iron or steel furnace itself, are used to heat the outer surface of the rotating pellet preheat chamber.

It is also an object of the present invention to provide a post-combustion fuel burner in the external heating chamber having an excess of oxygen supplied thereto over and above that necessary for combustion of the fuel such that the excess oxygen will combine with CO in the waste gases to form $CO_2$.

It is still another object of the present invention to control the temperature and atmospheric conditions inside the preheat chamber by adding interior heat as needed, adding inert gas (hot or cold) as needed to maintain an oxygen free condition and to provide a positive pressure in the pellet preheat chamber to isolate the interior of the pellet preheat chamber from external oxygen supplies, and adding reducing gas (hot or cold) as needed to ensure total reduction of the pellets.

It is still another object of the present invention to introduce inert and/or reducing gases into the preheat chamber as necessary to control temperature inside the preheat chamber, to prevent overheating and premature fusion of the self-reducing pellet charge, and to maintain the oxygen-free or reducing conditions inside the preheat chamber.

It is still another object of the present invention to provide for the introduction of inert and/or reducing gasses into the preheat chamber as necessary to control temperatures inside the preheat chamber, to prevent overheating and premature fusion of this self-reducing pellet charge, and to maintain oxygen-free or reducing conditions inside this preheat chamber.

Thus, in the present invention, waste heat is used as the primary energy source to indirectly heat the pellet feed material and to drive the reduction reaction. An oxygen free atmosphere is maintained at all times during the reduction process by maintaining a positive pressure within the preheat chamber. Control of the temperature and the atmospheric conditions inside the reheat chamber is accomplished (1) by adding interior chamber heat as required, (2) adding inert gas (hot or cold) as needed, and (3) adding a reducing gas (hot or cold) as needed. Once the pellets are preheated and reduced in the preheat chamber, they are transferred to the "molten material" in the ironmaking or steelmaking furnace as quickly as possible to prevent reoxidation. The preferred preheat chamber is a rotating cylinder.

Thus, the present invention relates to apparatus for preheating self-reducing iron oxide pellets and transferring the preheated pellets to an iron or steel furnace the apparatus including a direct heat source, a waste heat source, a rotating cylindrical preheat chamber having a pellet feed end and a pellet discharge end, the preheat chamber receiving internal heat from the direct heat source and external heat from the waste heat source to preheat the pellets therein, the heating of the pellets generating CO as a gaseous waste heat, and pellet transfer means for transferring the preheated pellets substantially directly to the ironmaking or steelmaking furnace.

BRIEF DESCRIPTION OF THE DRAWINGS

These and other features of the present invention will be more fully disclosed in the following DETAILED DESCRIPTION OF THE INVENTION in which like numerals represent like elements and in which.

DETAILED DESCRIPTION OF THE INVENTION

Figure 1:
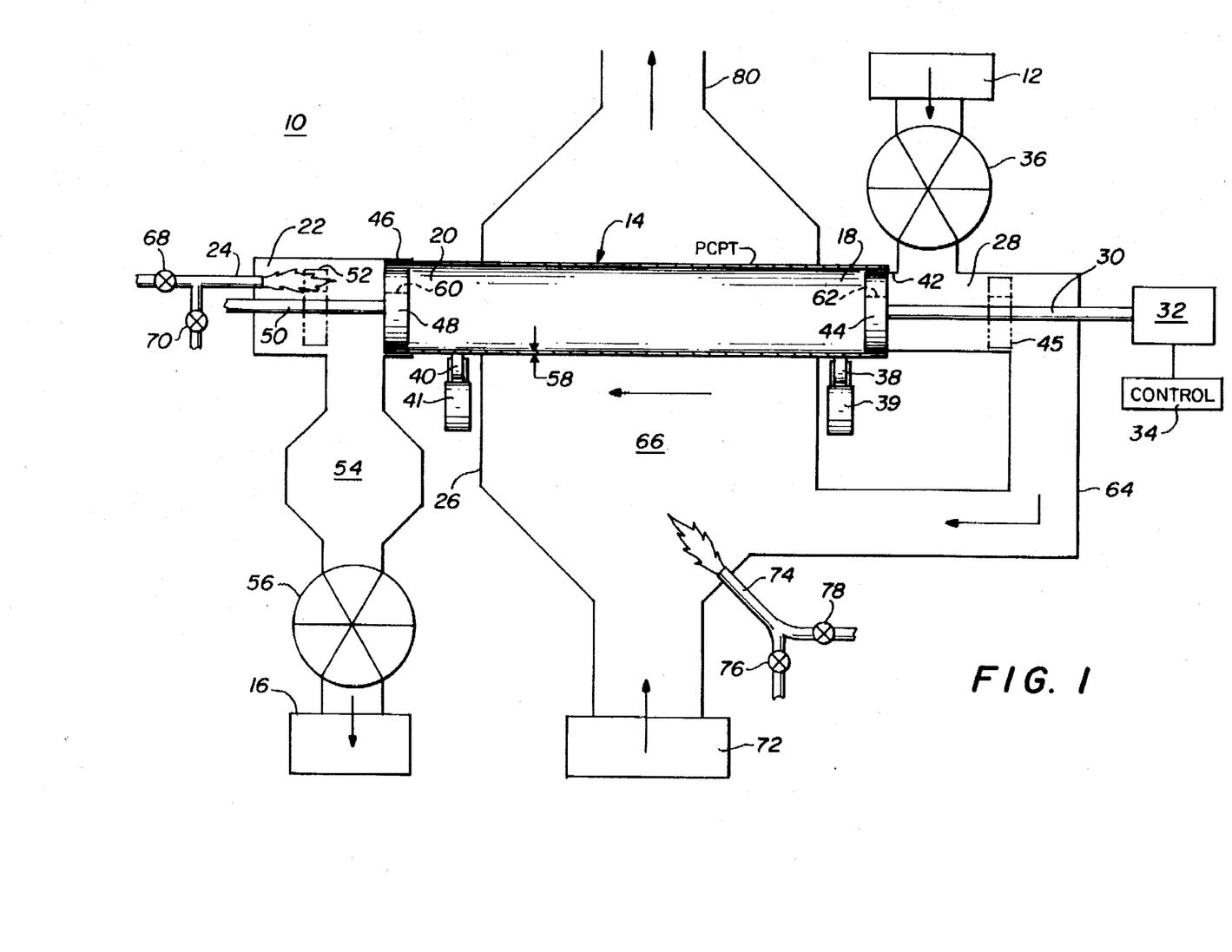
FIG. 1 is a schematic representation of a first embodiment of a novel apparatus for preheating self-reducing iron oxide pellets for direct use in an ironmaking or steelmaking furnace.

The novel apparatus for preheating self-reducing iron oxide pellets for direct use in an ironmaking or steelmaking furnace is illustrated in a first embodiment in FIG. 1 in schematic arrangement. The system 10 includes a storage bin of pellets or agglomerates 12, a preheat chamber 14, and the ironmaking or steelmaking furnace 16. The preheat chamber 14 is a pellet tumbler that rotates continuously at a speed, R. Rotation of the preheat chamber pellet tumbler 14 is essential to assure temperature uniformity within the preheat chamber 14, to prevent distortion of the preheat chamber pellet tumbler 14 due to temperature differences, and to promote temperature uniformity in the pellet charge inside the preheat chamber 14. The thickness, T, represented by the numeral 58, of the heat resistant and high temperature corrosion-resistant cylinder or pipe forming the pellet preheat chamber 14 must be sufficient so that the preheat chamber 14 acts as a "thermal flywheel" given the possible cyclical temperature profile of waste heat sources that, as will be described hereafter, are used as the primary source of energy with which to preheat the pellets. The thickness 58 also assures that the preheat chamber possesses sufficient strength to support its own weight and the weight of the contained pellet charge. The preheat chamber 14 has a feed end 18 and a discharge end 20. A flame chamber 22 is associated with the discharge end 20 of the preheat chamber 14 and has therein an internal preheat burner 24 for producing an internal flame as an additional heat source to provide heat as needed to heat the interior of the preheat chamber 14. As stated earlier, an external heating chamber 26 utilizes waste heat from industrial operations as will be explained hereafter as the primary energy source that is used to heat the preheat chamber externally.

A feed chamber 28 is associated with the feed end 18 of the rotating preheat chamber 14. A piston rod 30 coupled to a charge piston 44 moves the charge piston between the position shown at 44 at the feed end 18 of the preheat chamber 14 and the position shown in phantom lines 45. The piston is moved in any conventional way by a power device 32 operated by a control 34, all of which would be well known in the art. When the piston 44 is moved to the position shown in phantom lines 44, a pellet feed valve 36, well known in the art, can be opened to deliver a predetermined charge of pellets from the storage bin 12 to the feed chamber 28. The pellet feed valve 36 is necessary to prevent escape of internal preheat chamber gases into the storage bin 12. It is noted in FIG. 1 that, in order to assure unimpeded flow of pellets into the pellet travel direction into the feed end 18 of the preheat chamber 14, the elongated cylindrical feed end 18 extends over the cylindrical end 42 of the stationary feed chamber 28. Again, this allows an unimpeded flow of pellets into the feed end 18 of the preheat chamber 14 when the piston moves from the position shown in phantom lines 45 to the position shown by the numeral 44.

At the opposite end, the flame chamber 22 has a circular portion 46 that extends over the discharge end 20 of the rotary pellet preheat chamber as shown. This allows an unimpeded flow of pellets from the preheat chamber 14 to the surge chamber 54. Piston 48 in the flame chamber 22 is movable from the position shown in the discharge end 20 of the preheat chamber 14 to the position shown by the phantom lines 52. In that position, charge piston 44 can be driven forwardly to the position shown by piston 48 to force all of the pellets out of the preheat chamber 14 into the surge chamber 54. Thus, the charge piston 44 has three positions. The first is at position 45, shown in phantom lines, which enables the charge of pellets to be deposited in the feed chamber 28. The second is the position shown at 44 where the piston moves to force the pellet charge into the interior of the rotating preheat chamber 14. The third position is in the position illustrated by piston 48 when piston 48 has moved to the position shown in phantom lines 52. To reach this position, the charge piston 44 moves through the center of the preheat chamber 14 thus forcing the pellets out of the discharge end 20 into the surge chamber 54. The discharge piston 48 has two positions, that shown at 48 during the preheating cycle to maintain the pellets within the preheat chamber 14, and the other position shown in phantom lines 52 to allow the charge piston to force the pellets out of the preheat chamber into the surge chamber 54. The surge chamber 54 is so constructed and lined with refractory brick in a well-known fashion to maintain the pellet heat.

The preheat chamber 14 is rotated by drive wheels 38 and 40 driven in any well-known manner by power sources 39 and 41, respectively. This tumbling action, as stated previously, causes an even heating of the pellet charge and maintains an even heating of the preheat chamber itself.

After preheating is completed in the preheat chamber 14, as stated earlier, the discharge piston is withdrawn from position 48 to position 52 in order to allow the charge piston 44 to be used to push the preheated pellets into the preheated insulated, refractory lined, surge chamber 54. At the appropriate point in the melting or smelting furnace cycle, when molten slag is present in sufficient amounts to absorb the preheated pellets, the preheated pellets are introduced substantially directly into the molten material in the ironmaking or steelmaking furnace 16 through a pellet output valve 56 well known in the art. The pellet output valve 56 is necessary to isolate the preheat chamber 14 and the surge chamber 54 from the atmosphere of the melting or smelting furnace 16. Further, the pellet output valve 56 minimizes the time of exposure of the preheated pellets to the furnace atmosphere during their introduction into the ironmaking or steelmaking furnace. This ability to control the rate of introduction of the preheated pellets into the melting or smelting furnace is a desirable degree of freedom for the process since a variety of melting or smelting furnace operating variables will dictate the rate at which the melting or smelting furnace slag and bath can absorb the preheated pellets with minimum re-oxidation.

As stated earlier, during the preheat cycle, the pellets are tumbled by rotation of the preheat chamber 14. The pellets are heated by contact with the preheat chamber itself and by additional hot gases as needed and produced by the firing of the internal preheat burner 24. The hot gases produced by the firing of the internal preheat burner 24 enter the preheat chamber through vents 60 in the discharge piston and exit the preheat chamber through vents 62 in the charge piston 44. Contact of interior gases with the cylindrical wall of the preheat chamber 14 helps keep the gases hot during their travel through the preheat chamber 14. The hot gases produced by the internal preheat burner 24 produce a positive pressure on the interior of the preheat chamber 14 to prevent air or oxygen from the atmosphere from entering.

When used, the internal preheat burner 24 is fired with natural gas through valve 68 and oxygen or air through valve 70. An excess of natural gas is used so as to completely consume the oxygen that is introduced. The preheating process continues until the pellet charge reaches at least 1000° C. At such time, the flow of natural gas through valve 68 may be reduced and/or replaced with reducing and/or inert gas so as to control the temperature and prevent overheating and fusion of the pellets/agglomerates inside the preheat chamber 14. It will be understood that during the preheating process, the carbon in the pellets combines with oxygen in the iron oxide thereby reducing the iron to metallic form and evolving both CO and $CO_2$ gas. The evolved CO and $CO_2$ gas accompany the preheat burner gases which are vented through vents 62 into conduit 64 that is coupled to the interior 26 of the external heating chamber 26. It will be seen that the external heating chamber 66 encompasses and surrounds at least a portion of the preheat chamber 14. The pellet tumbler drive wheels 38 and 40 are outside the external heating chamber 26 as shown.

Since the waste heat gases can also contain CO, provision is made for introducing oxygen or air into the interior 66 of the external heating chamber 24 through a post-combustion burner 74 fired with natural gas or other suitable fuel through valve 78 that is operated with an excess of oxygen through valve 76 over what is needed to consume the fuel introduced. The excess oxygen introduced by the post-combustion burner 74 will combine with the CO in the waste heat gases and the preheat burner gases to produce $CO_2$. After heating the external surface of the preheat chamber 14, the waste gases in the interior 66 of the external heating chamber 26 are vented through vent 80 to a recovery device such as a baghouse or scrubber. The exhaust gases or waste heat gases generally designated by the numeral 72 may be the exhaust gases from melting or smelting furnaces such as, for example, the electric arc furnace, the basic oxygen furnace, and the energy optimizing furnace. Further exhaust gases from liquid or gas-fired furnaces used to heat or reheat semi-finished steel for hot working, including hot rolling and waste heat from and liquid or gas-fired furnaces used to heat or to reheat hot or cold worked steel respectively for the purpose of thermal treatment including annealing may be represented by the numeral 72.

In summary, the apparatus in FIG. 1 operates as follows. Self-reducing pellets are fed from a storage bin 12 through a pellet feed valve 36 into a stationary pellet feed chamber 28. Once the pellet feed chamber 28 is charged, the charge piston at location 45 pushes the pellets into the preheat chamber 14 by moving to position 44. The cycle of charging the stationary feed chamber 28 and pushing the pellets into the preheat chamber 14 with piston 45 is repeated until the preheat chamber is filled with the desired amount of pellets. Preheating of the pellets then occurs inside the preheat chamber 14 that is rotating continuously at a speed, R, by means of pellet tumbler drive wheels 38 and 40. The preheat chamber 14 is heated primarily externally through an external heating chamber 26 that at least partially surrounds and encloses the preheat chamber 14 and that utilizes waste heat gases from an external source such as the ironmaking or steelmaking furnace itself as well as the waste heat gases from the interior of the preheat chamber 14 through conduit 64. In addition, if needed, the chamber is heated on the interior with an internal preheat burner 24. The internal preheat burner 24 is fired with natural gas and oxygen or air and an excess of natural gas is used so as to completely consume the oxygen introduced. The preheating process continues until the pellet charge reaches at least 1000° C. At such time, the flow of natural gas is reduced or replaced with reducing and/or inert gas so as to control the temperature and prevent overheating and diffusion of the pellets inside the preheat chamber. During preheating, the carbon in the pellets combines with the oxygen in the iron oxide thus reducing the iron to metallic form and evolving CO and $CO_2$ gas. The evolved CO and the $CO_2$ gas accompany the preheat burner gases that are vented through vent 62 in piston 44 into the interior 66 of the external heating chamber 26 through conduit 64. Because the waste heat gases also contain CO, provision is made for introducing oxygen or air into the external heating chamber interior 66 through a post-combustion burner 74 fired with natural gas or other suitable fuel, which is operated with an excess of oxygen over what is needed to consume the fuel introduced. The excess oxygen introduced by the post-combustion burner 74 will combine with the CO in the waste heat gases and the preheat burner gases to produce $CO_2$.

After preheating is completed, the discharge piston 48 is withdrawn to the position shown at 52 to allow the charge piston 44 to be used to push the preheated pellets from the preheat chamber 14 into the preheated insulated surge chamber 54. At the appropriate point in the melting or smelting furnace cycle, when molten material is present in sufficient amount to absorb the preheated pellets, the preheated pellets are introduced substantially directly into the molten material in the ironmaking or steelmaking furnace through the pellet output valve 56.

Figure 2:
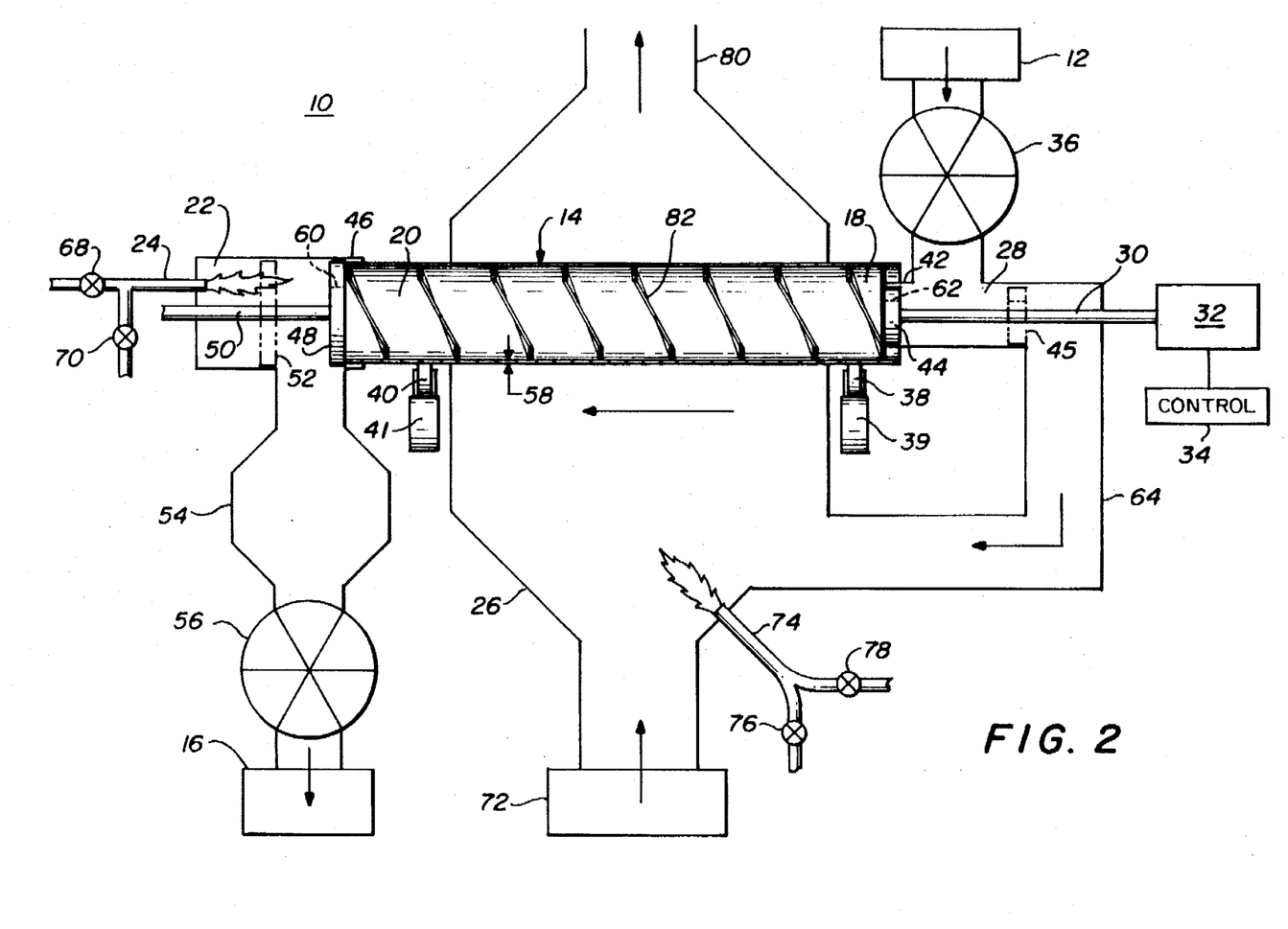
FIG. 2 is a schematic representation of a second embodiment of a novel apparatus for preheating self-reducing iron oxide pellets for direct use in an ironmaking or steelmaking furnace.

FIG. 2 is a schematic representation of a second preheat chamber configuration. Aside from the construction of the preheat chamber 14 itself, the remainder of the elements are the same as in FIG. 1. In FIG. 2, the inside of the preheat chamber pellet tumbler 14 is lined with a corkscrew blade or helical blade 82 substantially along the entire length of the preheat chamber 14. It acts to advance the pellets inside the preheat chamber 14 as the preheat chamber rotates. In this case, it is not necessary for the stroke of the charge piston 44 to extend beyond the end 42 of the stationary feed chamber 28 in order to charge the preheat chamber 14 with pellets because of the action of the helical or corkscrew blade 82. In this instance, piston 44, the charge piston, is smaller than the feed end 18 of the preheat chamber 14. This is because the helical blade 82 keeps moving the pellets away from the feed end 18 and therefore it does not need to be blocked to the extent as shown in FIG. 1. However, on the other end, the discharge piston 48 is larger than the diameter of the preheat chamber 14 to cover the entire discharge end 20 and prevent the pellets from emerging therefrom until piston 48 is moved to the position shown by the phantom lines 52. By continuously rotating the precharge chamber 14, and moving piston 48 to the position shown in 52, the supply of preheated pellets to the surge chamber 54 would be continuous. The discharge piston 48 would be extended to the end of the preheat chamber 14 as shown only under conditions in which it would be necessary to block the flow of preheated pellets into the surge chamber 54.

Figure 3:
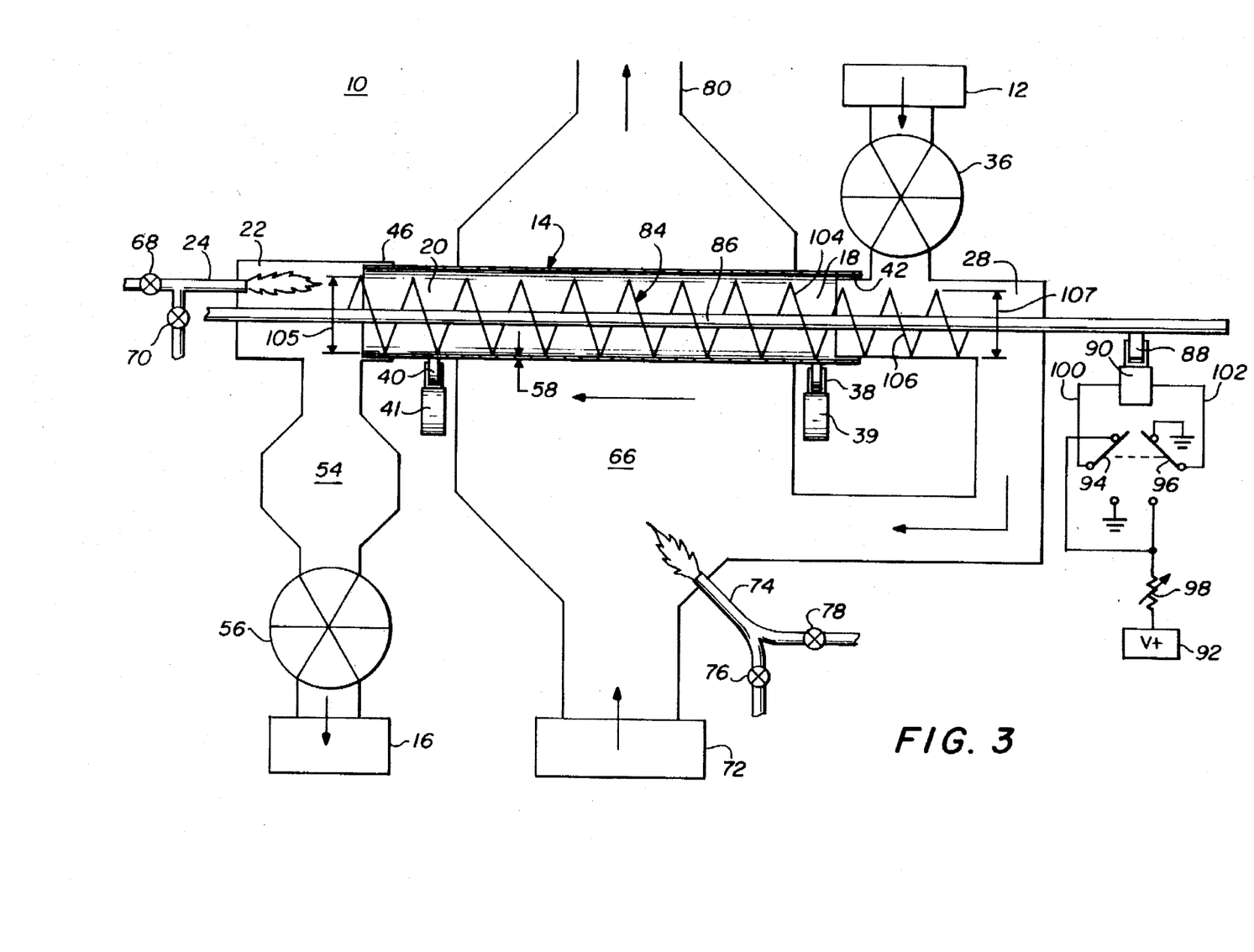
FIG. 3 is a schematic representation of a third embodiment of a novel apparatus for preheating self-reducing iron oxide pellets for direct use in an ironmaking or steelmaking furnace.

FIG. 3 is a schematic representation of a third embodiment of the preheat chamber. Again, except for the construction of the preheat chamber 14 and its pellet feeding mechanism, the remainder of the system is exactly the same as in FIGS. 1 and 2. In this embodiment, a rotating auger 84 extends through the pellet feed chamber 28 and the interior of the elongated preheat chamber 14 to the discharge end 24 thereof. When pellets from storage source 12 are transferred through feed valve 36 to the feed chamber 28, an auger portion 106 having a diameter 107 sufficient to be accommodated by the interior diameter of the feed chamber 28 carries the pellets forward into the interior of the preheat chamber 14. The preheat chamber 14 has an auger portion 104 that has a diameter 105, which is larger than the diameter of the auger 106 in the feed chamber 28. Thus the pellets are continuously carried into the rotating preheat chamber 48 and discharged from the discharge end 20 into the surge chamber 24. A drive wheel 88 or any other desired drive means, such as a chain drive, rotates the auger shaft 86 at a speed, r. The preheat chamber drive wheels 38 and 40 drive the preheat chamber 14 at a rotation speed R in the same direction as the auger 84 with r>R during charging the elongated preheat cylinder so as to move the pellet charge axially toward the discharge end 20 of the elongated preheat cylinder 14 and during discharging of the pellets to force the pellet charge from the discharge end 20 of the elongated preheat cylinder or chamber 14. The speed and direction of rotation of the auger can be controlled in a well-known manner with a control circuit so as to obtain r=–R when the pellet charge reaches the discharge end 20 of the elongated preheat chamber or cylinder 14 such that the pellet charge is maintained substantially stationary within the elongated preheat cylinder while allowing the pellet charge to preheat to the proper temperature. At that time, the auger is then reversed in direction such that, again, r>R and the pellets are then discharged into the surge chamber 54. The control circuit to drive the drive means 88 may be, for example, a voltage source 92 coupled through a variable resister 98 to vary the amount of voltage to motor 90 whose speed depends upon the voltage applied thereto. When the auger 84 is rotating in the same direction as the preheat chamber or cylinder 14, the voltage 92 is applied through switch contact 98, line 100, and motor 90 in a first direction and through line 102 and switch contact 96 to ground. The rheostat 98 may be adjusted to cause the speed of the auger 84 to be r>R. When the pellets arrive at the discharge end 20 of the preheat chamber 14 and are not yet at the temperature sufficient to be utilized in the ironmaking or steelmaking process, the double gang switch 94, 96 contacts are switched so that the voltage is applied through contact 96 and line 102 to motor 90 in the opposite direction thus driving it in the opposite direction. The voltage then exits motor 90 on line 100 and through switch contact 94 to ground. Thus the motor 90 drives the auger 84 in the reverse direction. Again its speed can be adjusted by adjusting rheostat 98. The reverse rotation of auger 84 maintains the pellets inside the preheat chamber until ready to be discharged. At that time, switch contacts 94, 96 are moved to the position shown to obtain r>R and the pellets are ejected from the preheat chamber 14 into the surge chamber 54. The switch contracts 94, 96 are shown for illustration purposes only and may be electronic, computer controlled switches.

In summary, the apparatus in FIG. 3 operates such that during charging of the preheat chamber 14, the auger 84 is rotated to move the pellet feed in the pellet travel direction to the interior of the preheat chamber 14. During charging, rotation of the auger 84 is controlled so that r>R. When the leading edge of the charge mass approaches the discharge end 20 of the preheat chamber 14, rotation of the auger 84 is adjusted so that r=–R. This counterrotation of the auger 84 with respect to the continuously rotating preheat chamber 14 keeps the charge stationary along the pellet travel direction while allowing the tumbling of the pellets which are heated by contact with the preheat chamber 14 itself, hot exterior gases in contact with the outer wall of the preheat chamber 14, and the hot gas produced by the internal preheat burner 24. After preheating is complete, counterrotation of the auger 84 is stopped and the auger 84 is again rotated in the same direction as the preheat chamber 14 but at a faster speed, r>R, so that the charge is moved towards the discharge end 20 and the preheated pellets are discharged into the surge chamber 54.

Thus there has been disclosed apparatus for preheating and using self-reducing pellets are agglomerates for direct ironmaking or steelmaking. The apparatus includes external heating of a preheat chamber containing the pellets using as a primary energy source the waste heat from industrial operations including melting exhaust gases and/or reheat exhaust gases combined with secondary direct heating of the pellets inside the chamber as necessary using a burner suitably fired to consume any oxygen introduced into the preheat chamber. Inert and/or reducing gases are introduced into the preheat chamber when necessary to control preheat chamber temperature and to prevent overheating and premature fusion of the preheated pellets, and to maintain a positive pressure inside the preheat chamber so as to prevent the introduction of oxygen into the chamber from any external source. The venting of the preheat chamber gases into the external heating chamber allows any CO that is present to be post-combusted to produce $CO_2$. The energy from such post-combustion is used to contribute to the external heating of the preheat chamber. By using pistons or augers that are rotated in the proper direction and at the proper speed provides the ability to control the discharge of the pellets from the preheat chamber in batch or in a semi-continuous mode into the melting or smelting furnace at appropriate time windows in the melting or smelting cycle.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. Apparatus for preheating self-reducing iron oxide pellets for direct use in an ironmaking or steelmaking furnace including:

a source of self-reducing iron oxide pellets containing sufficient carbon to reduce the iron to metallic form;

a preheat chamber between the source of pellets and the ironmaking or steelmaking furnace and having a feed end and a discharge end;

an external heat chamber in heat transfer relationship with the preheat chamber for utilizing waste heat as the primary energy source to provide heat to the preheat chamber;

a flame chamber associated with the pellet discharge end of the preheat chamber and the iron or steel furnace;

an internal heat generating source in the flame chamber for providing hot gases as needed directly to the interior of the preheat chamber as a secondary heat source;

a pellet feed chamber associated with the feed end of the preheat chamber and the pellet source for receiving a predetermined charge of pellets from the pellet source; and a charging device associated with the pellet feed chamber for transferring the predetermined charge of pellets to the interior of the preheat chamber for heating to a temperature sufficient to enable the preheated pellets to be transferred substantially directly to the iron or steel furnace without being disintegrated by thermal shock, to at least partially reduce the iron in the iron oxide to metallic form, to combine carbon with oxygen, and to generate hot waste gases.

2. Apparatus as in claim 1 wherein the preheat chamber includes:

a elongated preheat cylinder; and drive means for rotating the elongated preheat cylinder to tumble the pellets to provide even heating thereof.

3. Apparatus as in claim 2 wherein said external heating chamber encompasses and surrounds at least a portion of the rotating elongated preheat cylinder.

4. Apparatus as in claim 3 further including:

a cylindrical portion on the pellet feed chamber that extends inside the interior of the feed end of the elongated preheat cylinder to enable pellets to be fed therein unimpeded;

a charge piston movable in the cylindrical portion of the pellet feed chamber;

a power source coupled to the charge piston for moving the charge piston in the feed chamber between first and second positions, the first position of the charge piston enabling the predetermined charge of pellets to be received in the feed chamber; and the power source moving the charge piston to its second position to transfer the charge of pellets into the interior of the elongated preheat cylinder and to prevent the pellets from escaping from the feed end of the elongated preheat cylinder during preheating.

5. Apparatus as in claim 4 further including a pellet feed valve interposed between the pellet source and the feed chamber for transferring a predetermined charge of pellets from the pellet source to the feed chamber when the charge piston is in its first position and preventing escape of waste gases from the elongated preheat cylinder into the pellet source.

6. Apparatus as in claim 5 further including:

a cylindrical portion formed on the flame chamber and extending over the discharge end of the elongated preheat cylinder to enable proheated pellets to be discharged therefrom into the flame chamber unimpeded;

a discharge piston movable in the cylindrical portion of the flame chamber between first and second positions;

the first position of the discharge piston preventing the pellets from being discharged from the elongated preheat cylinder;

the second position of the discharge position allowing the pellets to be discharged from the elongated preheat cylinder; and a preheated insulated surge chamber for receiving the heated pellets discharged from the elongated preheat cylinder and maintaining the heated pellets in a substantially oxygen free environment.

7. Apparatus as in claim 6 wherein when the discharge piston moves to its second position, the charge piston moves through the interior of the elongated preheat cylinder to a third position at the discharge end to discharge the pellets from the interior of the elongated preheat cylinder.

8. Apparatus as in claim 6 wherein the elongated preheat cylinder has an outer wall with a thickness sufficient to form a thermal flywheel as the elongated preheat cylinder rotates to promote substantial temperature uniformity in the cylinder interior and the cylinder walls.

9. Apparatus as in claim 6 further including:

first vent orifices in the discharge piston for allowing heat generated by the flame chamber to enter the interior of the elongated preheat cylinder;

second vent orifices in the charge piston to allow hot waste gases generated therein to exit; and an enclosed passage coupling the hot waste gases vented by the charge piston to the interior of the heating chamber to provide additional heat within the elongated preheat cylinder.

10. Apparatus as in claim 6 further including:

an oxygen-free interior in the elongated preheat cylinder;

a positive pressure in the interior of the elongated preheat cylinder relative to the exterior for maintaining the oxygen-free environment;

a first fuel burner in the flame chamber as the secondary heat generating source for providing heat directly into the oxygen-free interior of the elongated preheat cylinder;

a first valve to regulate the amount of fuel needed to the first fuel burner to achieve the desired temperature and maintain the positive pressure inside the interior of the elongated preheat cylinder; and a second valve for injecting inert gas or reducing gas in proper proportion through the first fuel burner into the interior of the elongated preheat cylinder as necessary to control temperature inside the preheat chamber, to prevent overheating and premature fusion of the self-reducing pellet charge, to maintain the oxygen-free or reducing conditions inside the preheat chamber, assist in maintaining the positive pressure therein, and assist in maintaining the proper temperature therein.

11. Apparatus as in claim 10 further including said first valve providing natural gas to the first fuel burner as the fuel in controlled quantities such that all oxygen in the flame chamber and the interior of the elongated preheat cylinder is consumed and the proper temperature achieved.

12. Apparatus as in claim 10 including:

CO and $CO_2$ in the hot waste gases generated in the elongated preheat cylinder and coupled to the external heating chamber;

a post-combustion fuel burner in the external heating chamber for providing additional heat to the exterior of the elongated preheat cylinder;

an oxygen source coupled to the post-combustion burner for introducing oxygen in amounts in excess of that needed to consume the fuel, the excess oxygen combining with CO in the waste heat gases and elongated preheat cylinder gases to produce $CO_2$ as an exhaust gas; and a gas vent for venting the exhaust gases in the external heating chamber.

13. Apparatus as in claim 12 wherein said waste heat coupled to the external heating chamber comprises heated gases including melting exhaust gases, reheat exhaust gases, or waste exhaust gases from other industrial processes.

14. Apparatus as in claim 6 including;

first power means for moving the discharge piston to its second position when preheating of the pellets is completed;

second power means for moving the charge position to its third position to push the preheated pellets into the surge chamber;

molten material in the ironmaking or steelmaking furnace; and a pellet outlet valve to isolate the elongated preheat cylinder in the surge chamber from the atmosphere of the iron or steel furnace and for controlling the rate of introduction of the preheated pellets that are in the surge chamber substantially directly into the molten material in the ironmaking or steelmaking furnace at a redetermined time.

15. Apparatus as in claim 6 further including:

vent orifices in the discharge piston and the charge piston to enable the hot gases from the secondary internal heat generating source to enter the rotatable elongated cylinder and the hot waste gases to exit the rotatable elongated cylinder into the feed chamber, respectively; and a passageway coupling the hot waste gases in the feed chamber to the external heating chamber.

16. Apparatus as in claim 6 further including:

a helical blade on at least a portion of the inside surface of the elongated preheat cylinder such that as pellets are transferred into the interior of the elongated preheat cylinder by the charge piston, rotation of the elongated preheat cylinder causes the helical blade to advance the pellets toward the discharge end of the elongated preheat cylinder;

the discharge piston being maintained in its second position when allowing a continuous flow of pellets into the surge chamber; and the discharge piston being moved to its first position to block discharge of the pellets only under emergency conditions.

17. Apparatus as in claim 16 further including:

first vent orifices in the charge piston to allow hot waste gases generated therein to exit; and an enclosed passage coupling the hot waste gases vented by the charge piston to the external heating chamber to provide additional heat within the elongated preheat cylinder.

18. Apparatus as in claim 16 further including:

an oxygen-free interior in the elongated preheat cylinder;

a positive pressure in the interior of the elongated preheat cylinder, relative to the exterior for maintaining the oxygen-free environment;

a fast fuel burner in the flame chamber as the secondary heat generating source for providing heat directly into the oxygen-free interior of the elongated preheat cylinder;

a fast valve to regulate the amount of fuel provided to the burner to achieve the desired temperature and to maintain the positive pressure inside of the interior of the elongated preheat cylinder; and a second valve for injecting inert gas or reducing gas in proper proportion through the first fuel burner into the interior of the elongated preheat cylinder as necessary to control temperature inside the preheat chamber, to prevent overheating and premature fusion of the self-reducing pellet charge, to maintain the oxygen-free or reducing conditions inside the preheat chamber, assist in maintaining the positive pressure therein, and assist in maintaining the proper temperature therein.

19. Apparatus as in claim 18 further including the first valve providing natural gas to the first fuel burner as the fuel in controlled quantities such that all oxygen in the flame chamber and the interior of the elongated preheat cylinder is consumed and the proper temperature maintained.

20. Apparatus as in claim 18 wherein:

the hot waste gases generated in the elongated preheat cylinder and coupled to the external heating chamber include CO and $CO^2$; and said waste heat coupled to the external heating chamber comprises hot exhaust gases including melting exhaust gases, reheat exhaust gases, or waste exhaust gases from other industrial processes.

21. Apparatus as in claim 20 further including:

a post-combustion fuel burner in the external heating chamber for providing additional heat;

an oxygen source coupled to the post-combustion burner for introducing oxygen in amounts in excess of that needed to consume the fuel, the excess oxygen combining with CO in the waste heat gases and elongated preheat cylinder gases to produce $CO_2$ as an exhaust gas; and a gas pipe for venting the exhaust gases in the external heating chamber.

22. Apparatus as in claim 3 further including:

a cylindrical portion formed with the pellet feed chamber and extending inside the interior of the feed end of the elongated preheat cylinder to enable pellets to be fed therein unimpeded;

a cylindrical portion formed with the flame chamber and extending over the discharge end of the elongated preheat cylinder to enable preheated pellets to be discharged therefrom unimpeded;

a rotating auger extending through the feed chamber and the interior of the elongated preheat chamber to the discharge end thereof;

a pellet feed valve interposed between the pellet source and the feed chamber for transferring a predetermined charge of pellets from the pellet source to the auger in the feed chamber, said feed valve preventing escape of waste gases from the elongated preheat cylinder to the pellet source; and the rotating auger conveying the charge of pellets into and through the interior of the elongated preheat cylinder for preheating.

23. Apparatus as in claim 22 further including:

first power means for rotating the auger at a speed, r;

second power means for rotating the elongated preheat cylinder at a speed, R, in the same direction as the auger with r>R during charging the elongated preheat cylinder so as to move the pellet charge axially toward the discharge end of the elongated preheat cylinder and during discharging of the pellets to force the pellet charge from the discharge end of the elongated preheat cylinder; and speed and direction control means for adjusting the rotation and speed of the auger with respect to the elongated preheat cylinder so as to obtain r=-R when the pellet charge reaches the discharge end of the elongated preheat cylinder such that the pellet charge movement is maintained stationary within the elongated preheat cylinder while allowing the pellet charge to preheat to the proper temperature.

24. Apparatus for preheating self-reducing iron oxide pellets for direct use in an ironmaking or steelmaking furnace including:

a source of self-reducing iron oxide pellets;

a rotating preheat chamber for preheating the iron oxide pellets;

a waste heat supply chamber surrounding and at least partially encompassing the rotating preheat chamber and coupled to a waste heat source for receiving and transferring waste heat gases to the exterior of the rotating preheat chamber; the waste heat supply chamber serving as the primary heat source for the preheat chamber;

a secondary heat source for assisting in producing a positive pressure in the interior of said preheat chamber to maintain an oxygen free environment;

a pellet charging device for receiving a pellet charge from the pellet source and transferring the charge to the interior of the rotating chamber for preheating; and a pellet discharging device for discharging the preheated pellets substantially directly into the ironmaking or steelmaking furnace.

25. Apparatus as in claim 24 further including:

said secondary heat source for providing additional heat directly to the interior of the preheat chamber as needed to achieve the desired temperature;

a first valve coupled to the secondary heat source for controlling the amount of fuel to provide the additional heat; and a second valve for adding an inert gas and a reducing gas in proper proportions to the interior of the rotating preheat chamber to maintain the oxygen free conditions therein, assist in maintaining the positive pressure therein, and to assist in maintaining the proper temperature therein.

26. Apparatus as in claim 25 wherein said rotating preheat chamber is an elongated rotating cylinder.

27. Apparatus for preheating self-reducing iron oxide pellets and transferring the preheated pellets to an ironmaking or steelmaking furnace including:

a waste heat source;

a rotating cylindrical preheat chamber;

means for providing said preheat chamber with a substantially oxygen free environment therein during the reduction process:

said preheat chamber having a pellet feed end and a pellet discharge end;

the preheat chamber receiving external heat from the waste heat source to preheat the self-reducing iron oxide pellets therein; and pellet transfer means for transferring the preheated pellets substantially directly to the ironmaking or steelmaking furnace.

28. Apparatus as in claim 27 further including:

a secondary heat source for assisting in maintaining said oxygen free environment in said rotating preheat chamber and for providing additional heat to the interior of the rotating cylindrical preheat chamber to ensure the proper temperature for self-reduction of the iron oxide pellets.

29. Apparatus as in claim 28 further including:

a source of inert gas and self-reducing gas; and a valve coupled to the source of inert gas and self-reducing gas for providing said inert gas and self-reducing gas in proper proportions to the interior of the preheat chamber to assist in controlling the temperature therein, maintaining a positive pressure therein, and maintaining said oxygen free environment therein.

30. Apparatus as in claim 27 further including a helical blade attached to the inside of the rotating preheat cylindrical chamber to advance the iron oxide pellets through the rotating preheat cylindrical chamber from the feed end to the discharge end.

31. Apparatus as in claim 27 further including:

an auger within the rotating cylindrical preheat chamber;

a first power source for rotating the auger at a rate, r;

a second power source for rotating the cylinder preheat chamber at a rate, R, where r>R to advance the pellets from the feed end to the discharge end;

control means for reversing the auger rotation to r=-R when the pellets reach the discharge end to keep the pellet charge stationary within the rotating preheat chamber until the pellets are preheated; and the control means rotating the auger at r>R to discharge the preheated pellets from the rotating preheat cylinder.

32. Apparatus as in claim 27 further including:

a pellet source;

a pellet feed chamber;

a pellet feed valve for releasing a pellet charge from the pellet source into the pellet feed chamber;

a device in the pellet feed chamber for inserting the pellet charge into the feed end of the rotating preheat chamber;

a surge chamber associated with the discharge end of the rotating preheat chamber for receiving the discharged pellets; and a pellet output valve coupled to the surge chamber for transferring the preheated pellets in the surge chamber substantially directly into the iron or steel furnace.

33. Apparatus as in claim 32 further including;

an external heating chamber surrounding and at least partially enclosing the rotating preheat cylindrical chamber in a sealed relationship;

a first conduit coupling gaseous waste heat from the rotating preheat chamber interior to the external heating chamber; and a second conduit coupling gaseous waste heat from the waste heat source to the external heating chamber.

34. Apparatus as in claim 33 further including:

a post-combustion fuel burner in the external heating chamber to add heat and provide excess oxygen over and above that needed to consume the fuel, the excess oxygen combining with the gaseous waste heat CO to form $CO_2$ as an exhaust gas; and a gas pipe for venting the exhaust gases from the external heating chamber.

* * * * *